Oct. 11, 1938.    B. C. MOISE    2,132,575
WELDED JOINT
Filed June 23, 1937    2 Sheets-Sheet 1

Inventor:
BOLTON C. MOISE,
by: Usina & Lauber
his Attorneys.

Oct. 11, 1938.  B. C. MOISE  2,132,575
WELDED JOINT
Filed June 23, 1937   2 Sheets-Sheet 2
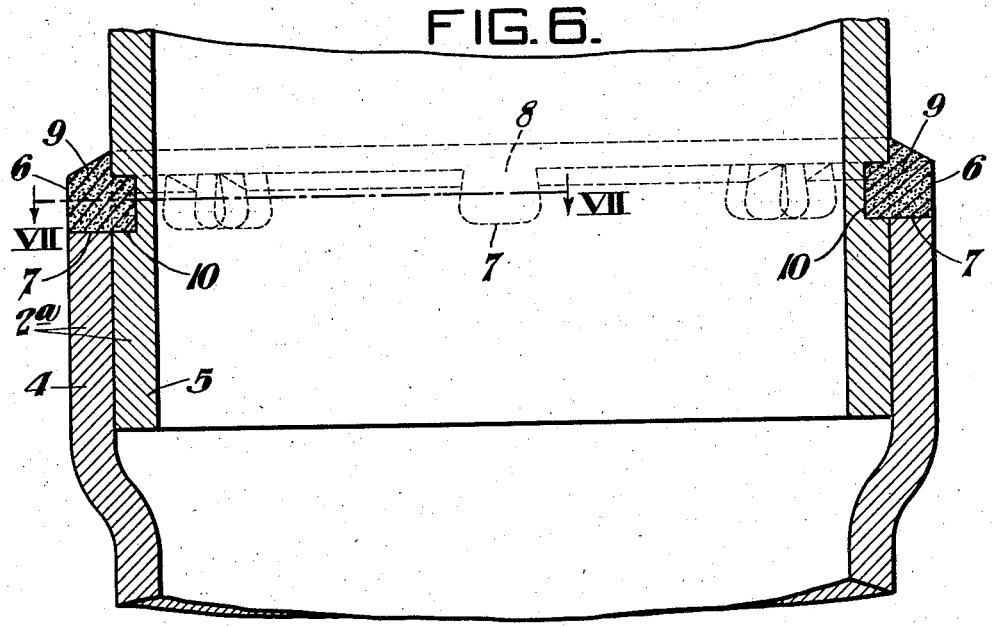
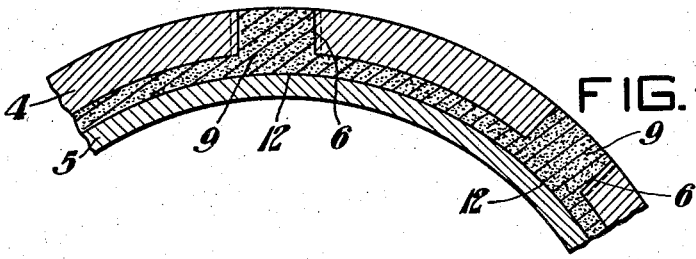
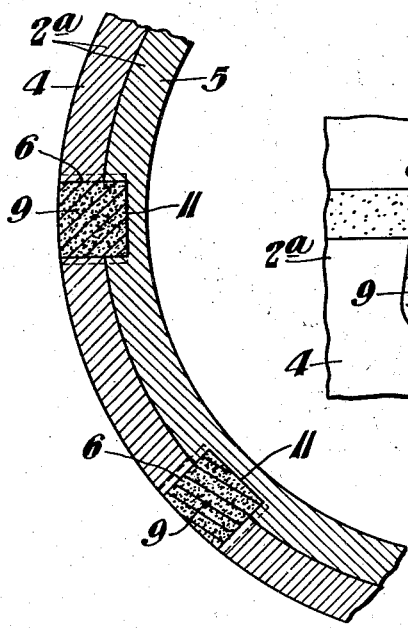
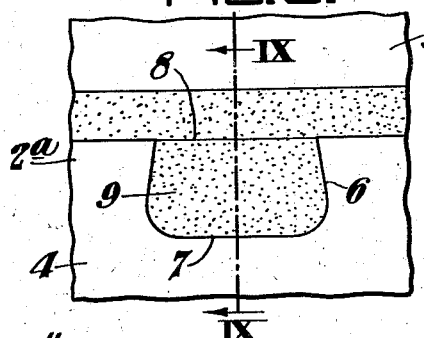
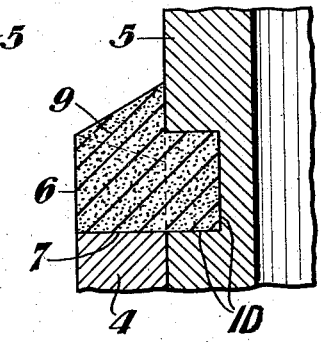
Inventor:
BOLTON C. MOISE,
by: his Attorneys.

Patented Oct. 11, 1938

2,132,575

UNITED STATES PATENT OFFICE 2,132,575

WELDED JOINT

Bolton C. Moise, Pittsburgh, Pa., assignor to National Tube Company, a corporation of New Jersey Application June 23, 1937, Serial No. 149,998

1 Claim. (Cl. 285—115)

This invention relates to welded joints and more particularly to those of the type generally known as "slip" joints.

In joining together tubular sections which convey fluids under high pressure and are subjected to great longitudinal stresses, such as for instance oil well casing, it has heretofore been impossible to make joints that are both fluid-tight and sufficiently strong to withstand the stresses imposed on them. Threaded joints are relatively strong but are not in all cases fluid-tight. This has led to the rise of slip type joints, or bell and spigot joints, wherein one end of the tubular section to be joined is expanded for a short distance from one end and the unexpanded end of the next section is inserted therein and the two are welded together by means of a fillet weld at the end of the expanded portion. This type of joint barring imperfections in the weld is fluid-tight but may fail under relatively low "pull-out" tests. A "pull-out" test is understood to be any test wherein a joint is subjected to longitudinal tension until failure occurs either in the jointed tubular sections or in the joint.

It is accordingly an object of the present invention to provide a fluid-tight joint which will withstand high longitudinal stresses.

A further object of the present invention is to provide a welded slip joint which will withstand high longitudinal stresses.

The foregoing and further objects will be apparent after referring to the drawings, in which:

Figure 6 is a view similar to Figure 1 but disclosing a modification.

Figure 7 is a sectional view on the line VII—VII of Figure 6.

Figure 8 is an enlarged detail.

Figure 9 is a sectional view on the line IX—IX of Figure 8.

Figure 10 is a view similar to Figure 7 but disclosing a further modification.

Figure 1:
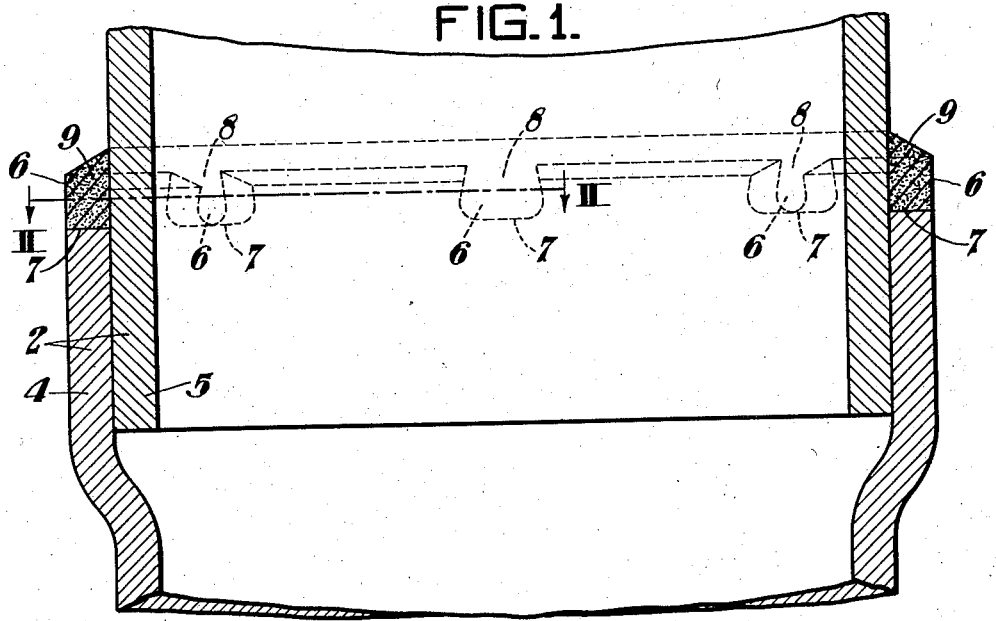
Figure 1 is a fragmentary sectional view of a pair of tubular members which are connected by the welded joint of the present invention.
Figure 2:
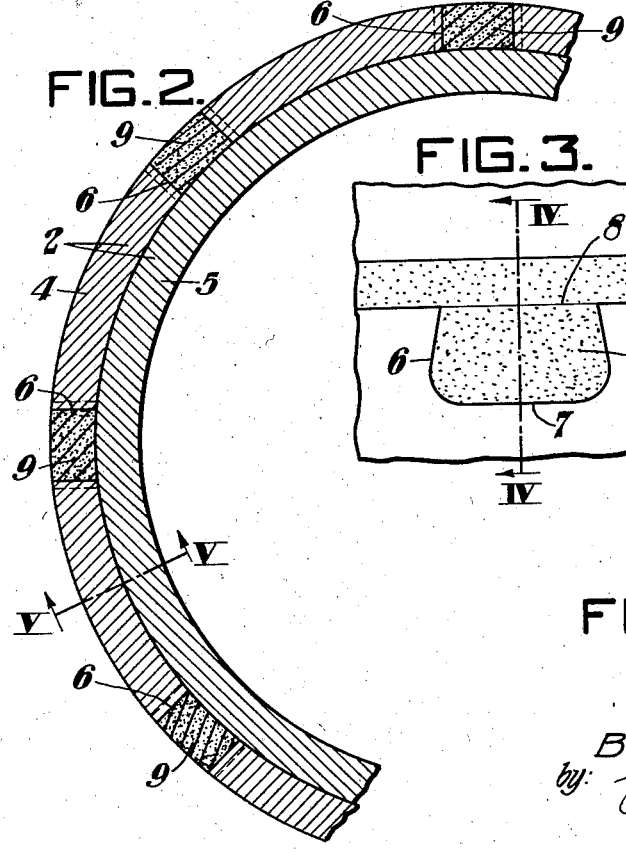
Figure 2 is a sectional view on the line II—II of Figure 1.
Figure 3:
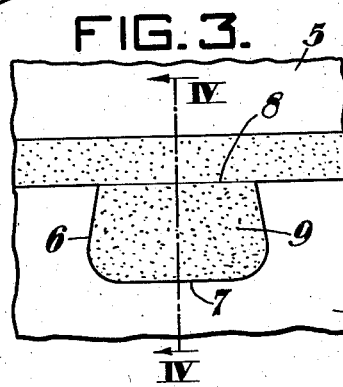
Figure 3 is an enlarged detail.
Figure 4:
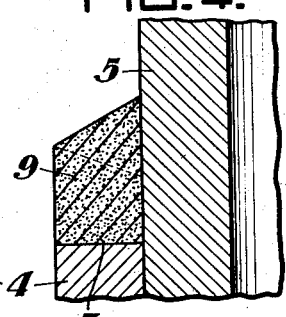
Figure 4 is a sectional view on the line IV—IV of Figure 3.
Figure 5:
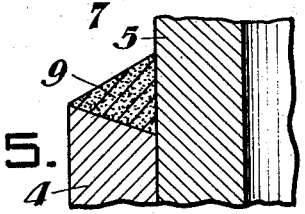
Figure 5 is a sectional view on the line V—V of Figure 2.

Referring more particularly to the drawings, the numeral 2 designates the joint of my invention comprising a tubular section having an expanded, or bell, end 4 and a plain-ended tubular section or spigot member 5 positioned therein. A plurality of cut-out portions 6 are provided around the extremity of the bell-end 4 which are larger across the bases 7 than at the tops 8, whereby a plurality of trapezoidal cut-out portions having the shorter of the two parallel sides at the outer end of the bell 4 are provided.

The members 4 and 5 are joined together by weld metal 9 deposited around the sides of, and within, the cut-out portions 6 and around the extremity of the bell 4 by conventional welding practice, such as oxy-acetylene or electric-arc methods. Thus, it will be seen that a much larger welded surface area is provided than is obtainable in the conventional slip joint wherein a fillet weld is made at the extremity of the bell member.

This increase of welded surface area greatly increases the "pull-out" strength of the joint and, in addition, it will be noted that should the weld metal break lose from the edges of the cut-out portions 6 it would not pull out of the same due to the taper of the openings, which wedges the weld metal therein.

Modifications of the joint of my invention, designated 2a, are shown in Figures 6, 7, 8, 9, and 10 of the drawings wherein a recess 10 in the outer surface of the plain or spigot member 5 is disposed beneath the cut-out portions 6. This recess 10 may be either in the form of individual depressions 11 as shown in Figure 7 or a continuous annular groove 12 as shown in Figure 10. Accordingly, when the weld metal 9 is deposited in the cut-out portions it will project beyond the outer surface of the spigot member 5 into the recess 10, (whether individual depressions 11 or continuous annular groove 12), and should the weld metal 9 be broken loose from the spigot member 5 by severe stresses imposed on the joint, the separation of the members 4 and 5 will still be prevented by reason of the weld metal 9 being held within the recess 10.

While I have shown and described several specific embodiments of my invention, it will be understood that I do not wish to be limited exactly thereto, since various modifications may be made without departing from the scope of my invention, as defined by the following claim.

I claim:

A telescoped pipe or rod joint comprising a member having a hollow end, and a second member having one of its ends disposed in the hollow end of said first-named member, said first-named member having a plurality of spaced axially extending slots through the extremity thereof, said slots being extended through the wall of said first-named member and having their outer ends of reduced width, said second-named member having a recess opposite each of the slots in said first-named member said members being secured together by a continuous mass of weld metal extending around the extremity of said first-named member and into said spaced axially extending slots and the recesses of said second-named member.

BOLTON C. MOISE.